(12) United States Patent
Moerman et al.

(10) Patent No.: US 7,788,422 B2
(45) Date of Patent: Aug. 31, 2010

(54) INTERFACE AND INTERRUPT CIRCUITRY COUPLING DATA TO HOST DMA CIRCUITRY

(75) Inventors: Filip Moerman, Tourrettes-sur-Loop (FR); Pierre Bertrand, Antibes (FR); David Q. Bell, Frederick, MD (US)

(73) Assignee: Texas Instruments Incorporated, Dallas, TX (US)

( * ) Notice: Subject to any disclaimer, the term of this patent is extended or adjusted under 35 U.S.C. 154(b) by 889 days.

(21) Appl. No.: 11/115,014

(22) Filed: Apr. 25, 2005

(65) Prior Publication Data

US 2005/0240688 A1 Oct. 27, 2005

(30) Foreign Application Priority Data

Apr. 27, 2004 (EP) .................. 04291093

(51) Int. Cl.
*G06F 13/28* (2006.01)
(52) U.S. Cl. ...................................... 710/22
(58) Field of Classification Search .......... 710/22
See application file for complete search history.

(56) References Cited

U.S. PATENT DOCUMENTS

| 4,458,314 | A | * | 7/1984 | Grimes | 710/123 |
| 4,703,418 | A | * | 10/1987 | James | 710/32 |
| 5,077,664 | A | * | 12/1991 | Taniai et al. | 710/22 |
| 5,974,480 | A | * | 10/1999 | Qureshi et al. | 710/27 |
| 6,115,425 | A | * | 9/2000 | Adachi et al. | 375/253 |
| 6,625,693 | B2 | * | 9/2003 | Arora et al. | 711/125 |
| 7,193,983 | B2 | * | 3/2007 | Liang et al. | 370/335 |
| 7,444,441 | B2 | * | 10/2008 | Petrie et al. | 710/22 |
| 2004/0213157 | A1 | * | 10/2004 | Karlsson et al. | 370/235 |
| 2005/0050249 | A1 | * | 3/2005 | Ide | 710/72 |

FOREIGN PATENT DOCUMENTS

EP 0 671 718 9/1995

* cited by examiner

*Primary Examiner*—Niketa I Patel
*Assistant Examiner*—Zachary K Huson
(74) *Attorney, Agent, or Firm*—Lawrence J. Bassuk; W. James Brady; Frederick J. Telecky, Jr.

(57) ABSTRACT

A method includes generating a transfer configuration descriptor ("TCD"), the TCD includes information pertaining to data to be transferred. The method further includes dynamically configuring a direct memory access ("DMA) channel based on the TCD without using a CPU and transferring a group of data blocks by way of the DMA channel.

2 Claims, 7 Drawing Sheets

INTERFACE AND INTERRUPT CIRCUITRY COUPLING DATA TO HOST DMA CIRCUITRY

This application claims priority under 35 USC §(e)(1) of European Application Number 04 291093.5 filed on Apr. 27, 2004.

BACKGROUND

Data may be transferred to a computer host processor (e.g., a digital signal processor) from a device (e.g., an Application Specific Standard Product or "ASSP") external to the host processor by way of any of a variety of techniques. One such technique is direct memory access or enhanced direct memory access (hereinafter collectively referred to as "DMA"). DMA permits a device to access computer memory for read and/or write operations without affecting the state of the computers central processing unit ("CPU"). For example, a computer system may allow a CD ROM drive to transfer data directly to the computer system's memory by way of a DMA channel, without requiring the CPU to read data from the drive and then write the data to memory. DMA is generally used in computer systems to circumvent the CPU during data transfers, thereby permitting the CPU to perform other useful work and increase the overall efficiency of the computer system.

Dynamic reconfiguration of a DMA channel allows the DMA channel to be adjusted to the parameters of data block (s) being transmitted through the channel. Thus, a DMA channel that successfully transmits a small, first data block also may transmit a large, second data block, because the DMA channel may be dynamically (i.e., "on the fly") reconfigured according to each data block's parameters. However, dynamic reconfiguration requires a substantial amount of CPU processing overhead. Repeated dynamic reconfigurations may require substantial processing cycles and result in a waste of transfer bandwidth. Additionally, some applications (e.g., 3G base stations) may require multiple, small-sized data transfers that result in additional processing overhead, further decreasing CPU efficiency.

BRIEF SUMMARY

The problems noted above are solved in large part by a method and system for transferring a group of data blocks by way of a dynamically configurable DMA channel. One exemplary embodiment may comprise generating a transfer configuration descriptor ("TCD") comprising information pertaining to data to be transferred. The embodiment may further comprise dynamically configuring a direct memory access ("DMA") channel based on said TCD without using a CPU and transferring a group of data blocks by way of said DMA channel.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection by way of other devices and connections. Additionally, the term "DMA" as used throughout the following discussion is defined as a system that permits a device to access computer memory for read and/or write operations without affecting the state of the computer's central processing unit ("CPU"). The term "DMA" comprises direct memory access systems, enhanced direct memory access systems and any variations thereof.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As explained previously, dynamic reconfiguration of DMA channels may require substantial overhead and waste bandwidth. As described herein, however, DMA channels are provided that can be dynamically reconfigured without using excessive CPU processing power or transfer bandwidth. The mechanism employed enables an external device (e.g., an ASSP or any application-specific integrated circuit external to the host described below) to transfer data to a host (e.g., a DSP) without any intervention from any host CPU. The mechanism also enables the external device to conjoin a plurality of data blocks so that the data blocks are transferred in a single transfer session, using a single DMA channel. In this manner, data transfer efficiency is increased.

Figure 1:
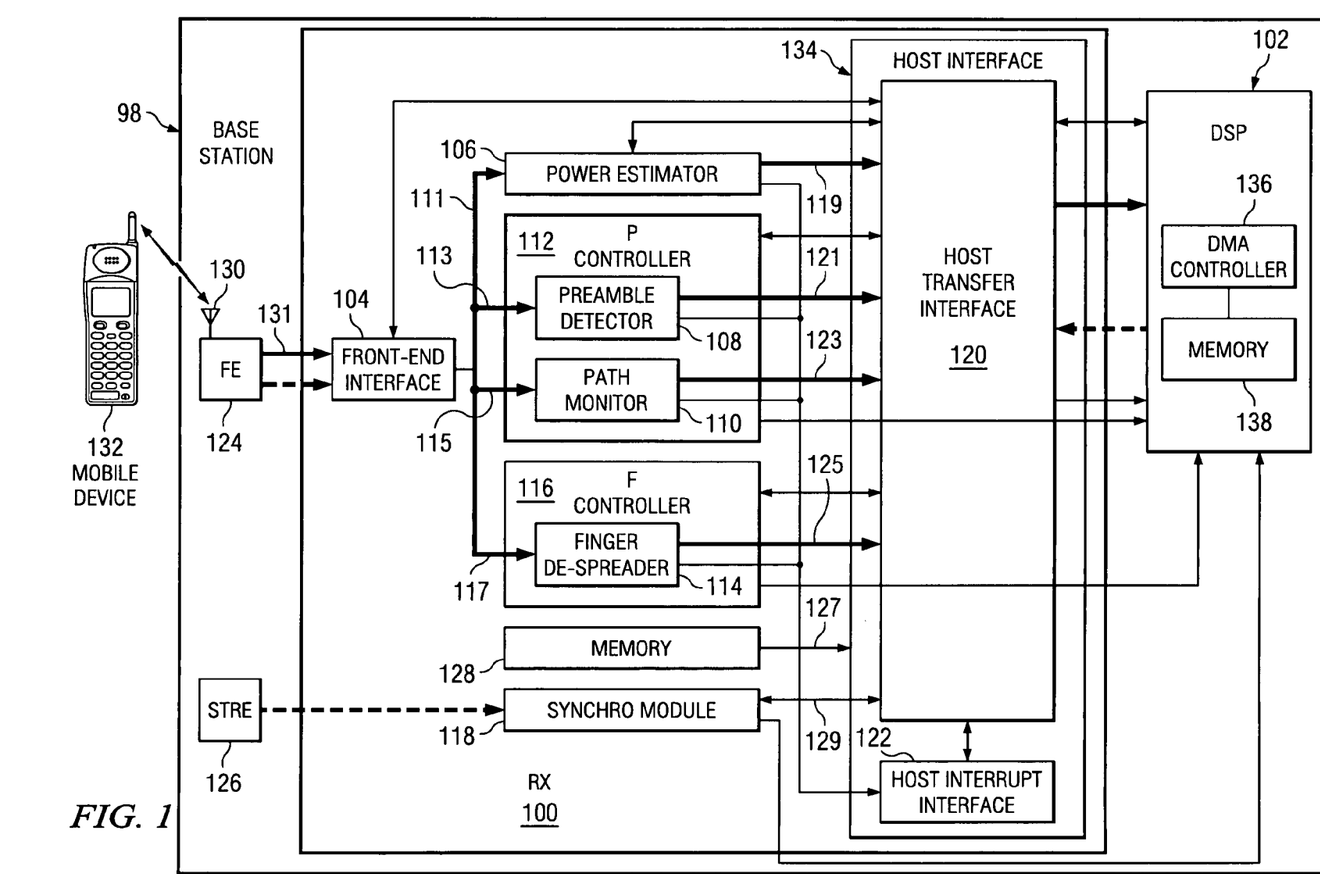
FIG. 1 illustrates a block diagram of an application-specific integrated circuit in communications with a mobile communication device and a digital signal processor in accordance with embodiments of the invention.

More specifically, the external device comprises a host interface that facilitates data transfer from the external device to the host. By using DMA capabilities of the host as explained below, the host interface reduces data transfer overhead and transfers data to the host without any intervention from any host CPU. FIG. 1 illustrates a mobile device 132 in wireless communications with a base station 98 comprising an external device RX 100 coupled to a host DSP 102. The mobile device 132 may comprise a mobile telephone, a personal digital assistant ("PDA"), or any appropriate mobile communication device. The base station 98 may comprise a mobile phone base station or any base station suitable for wireless communications with a mobile communication device. In at least some embodiments, there may exist a plurality of mobile devices 132 in wireless communications with the base station 98. A system comprising at least one mobile device 132 and a base station 98 may be used in any application, such as common mobile phone usage as provided by service networks (e.g., Sprint, Verizon, AT&T). Data may be wirelessly transmitted from the mobile device 132 to the base station 98 and then processed by the RX 100. The data may comprise voice data and/or any appropriate type of data. Using techniques described below, the data subsequently may be transferred to the DSP 102 for storage in a memory 138.

The RX 100 may comprise, among other things, a front-end interface 104 coupled to a power estimator 106 by way of a data bus 111, a P controller comprising a preamble detector 108 and a path monitor 110 by way of data buses 113 and 115, and a F controller 116 comprising a finger de-spreader 114 by way of a data bus 117. The power estimator 106, the preamble detector 108, the path monitor 110 and the finger de-spreader 114 are collectively referred to as "RX modules." Each of the RX modules may be coupled to a host interface 134, comprising a host transfer interface ("HTI") 120 and a host interrupt interface ("HII") 122, by way of data buses 119, 121, 123, 125, respectively.

The RX 100 also may comprise a memory 128 and a synchronization module 118 coupled to the host interface 134 by way of data buses 127, 129, respectively. The front-end interface 104 is coupled to a front-end device 124 by way of a data bus 131. In at least some embodiments, the front-end device 124 may be coupled to an antenna 130 or other communication mechanism by which wireless communications are established with the mobile communication device 132. The synchronization module 118 is supplied with a strobe signal (i.e., a clock signal) from a strobe 126 that may be external to the RX 100.

Each of the four RX modules produces data blocks based upon wireless signals received by way of the antenna 130. Each data block comprises a double word address and a double word count. The double word address specifies an address of the first double word of the block. The address is relative to the first double word of a respective output buffer. The double word count specifies the number of double words in the block. The RX 100 stores these block attributes in Block Allocation Tables ("BAT"), located in the memory 128. Data blocks produced by each of the four RX modules may be stored in an output buffer of that RX module. As described below, data blocks are stored in output buffers until appropriate data events are processed, whereupon the data blocks are transferred to the DSP 102 by way of the host interface 134. Specific purposes and operations of the front-end device 124, the front-end interface 104, the strobe 126, the synchronization module 118 and the RX modules are not substantially relevant to the scope of this disclosure.

One purpose of the host interface 134 is to allow the HTI 120 to transfer data from the output buffers of the RX modules to the memory 138 of the DSP 102 when the HII 122 processes a data event, as described below. The host interface 134 transfers data to the DSP 102 using a DMA controller 136 in the DSP 102. More specifically, the host interface 134 uses the DMA controller 136 to configure (i.e., prepare) a single DMA channel for transmission of data. The data is then transferred in groups of data blocks from the output buffers to the memory 138 of the DSP 102 by way of this single DMA channel. As previously mentioned, data is transferred in groups of data blocks to distribute data transfer overhead among the data blocks, thereby increasing data transfer efficiency.

The RX 100 comprises a plurality of channels that transport data from the RX 100 output buffers to the host interface 134, from which the data is further transported to the DSP 102. Because channels comprise varying amounts of data, each channel is assigned channel attributes to track the amount of data in that channel. The channel attributes are stored in Channel Allocation Tables ("CAT") in the memory 128. More specifically, the channel attributes comprise a list of data blocks (i.e., a "block list"). The block list contains data block references and groups all data blocks that will be transferred using a single DMA channel. From the block list, a first block ID and a block count may be obtained. The first block ID identifies a data block corresponding to a first element of the block list. The block count comprises the number of total elements in the block list.

As previously mentioned, data blocks stored in an output buffer are transferred through a channel to the host interface 134 after a data event is executed by the host interface 134. When processed, a data event causes (i.e., "triggers") the channel to transfer the data blocks through the channel. When a data event is generated by one of the RX modules, the data event is stored in a Data Event Queue ("DEQ") until the HII 122 is ready to process the data event. A data event may be generated by, for example, a task-triggered channel. Task-triggered channels are channels that are triggered by a particular RX 100 task (i.e., RX 100 operation) pre-selected by an end-user or any appropriate entity. Thus, any RX 100 task may be designated as a data transfer trigger. In some embodiments, a task that writes (i.e., "dumps") a last data element of a data block to an output buffer is designated as the data transfer trigger, because no additional data elements remain in the data block. When a data event is processed and executed, the data blocks in a corresponding channel are transferred from an output buffer to the host interface 134 for transmission to the DSP 102.

Figure 2:
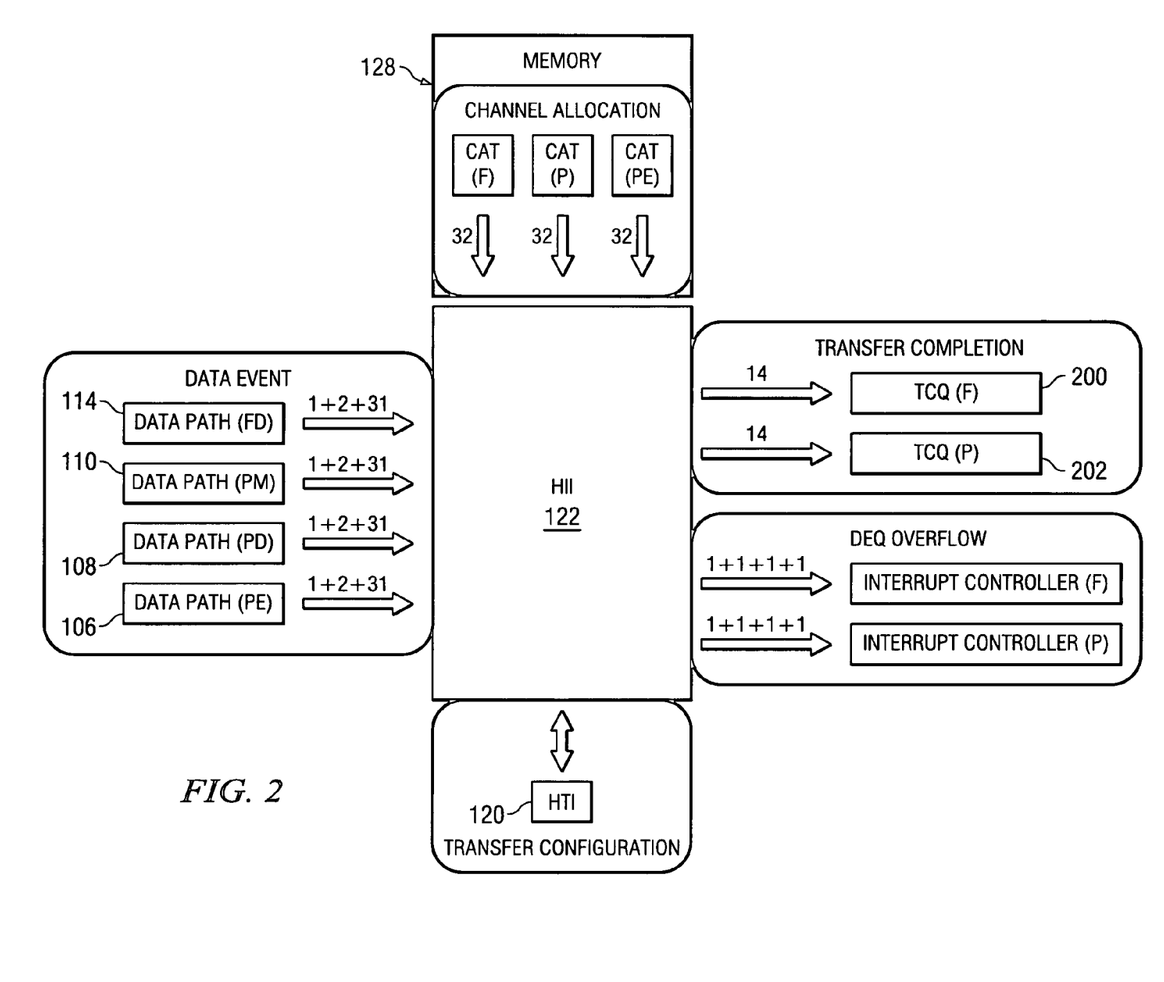
FIG. 2 illustrates a block diagram in accordance with embodiments of the invention.

The host interface 134 allows for access and transfer of data from the RX 100 to the DSP 102. More specifically, the HII 122 processes data events and exchanges information with the HTI 120 to initiate and complete transfers of data between the RX 100 and the DSP 102. FIG. 2 illustrates, among other things, interaction between the HII 122, the HTI 120 and the RX modules 106, 108, 110, 114. The HII 122 receives recently-generated data events from each of the RX modules by way of a data event bus. Each data event bus carries a data event comprising 34 bits. One of these 34 bits is a data event signal, another two bits describe a priority level of the data event, and the remaining 31 bits describe the data event with information comprising, among other things, a channel type and a channel ID.

Still referring to FIG. 2, in at least some embodiments, there exist three CATs in the memory 128, one for each control domain F, P (i.e., the F controller 116 and the P controller 112, respectively) and one for the power estimator 106. As described above, each CAT comprises allocation parameters for each channel. A CAT entry comprises 32 bits. Eleven of these bits comprise a first block ID, which identifies a first block used by the channel in a BAT. Another six bits comprise a block count, which specifies the number of blocks used by the channel in the BAT. The remaining 15 bits comprise a double word count, which specifies the number of double words per block used by the channel in the BAT.

Upon processing a data event received from a DEQ, the HII 122 may cause the HTI 120 to initiate a transfer of data from the RX 100 to the DSP 102 by sending a data transfer request. More specifically, the HII 122 may pass to the HTI 120 a first block ID copied from a corresponding CAT, a transfer configuration descriptor ("TCD") and a transfer information descriptor ("TID"), described below. The HTI 120 then may use this information to transfer data blocks to the DSP 102. In this way, the data blocks are transferred together, thereby distributing overhead associated with the transfer among all the data blocks and increasing overall efficiency of the data transfer. In at least some embodiments, the data blocks may be grouped together based on any of a variety of data block characteristics (e.g., size). Upon completion of the data transfer, the HTI 120 notifies the HII 122 that the transfer is complete. In turn, the HII 122 inserts a transfer completion indication in a TCQ 200, 202 to record the successful completion of the transfer. The HTI 120 may now be ready to complete another data transfer. In some embodiments, the HII 122 may be restricted from sending a new data transfer request to the HTI 120 before the HTI 120 has successfully executed a previous data transfer.

Figure 3:
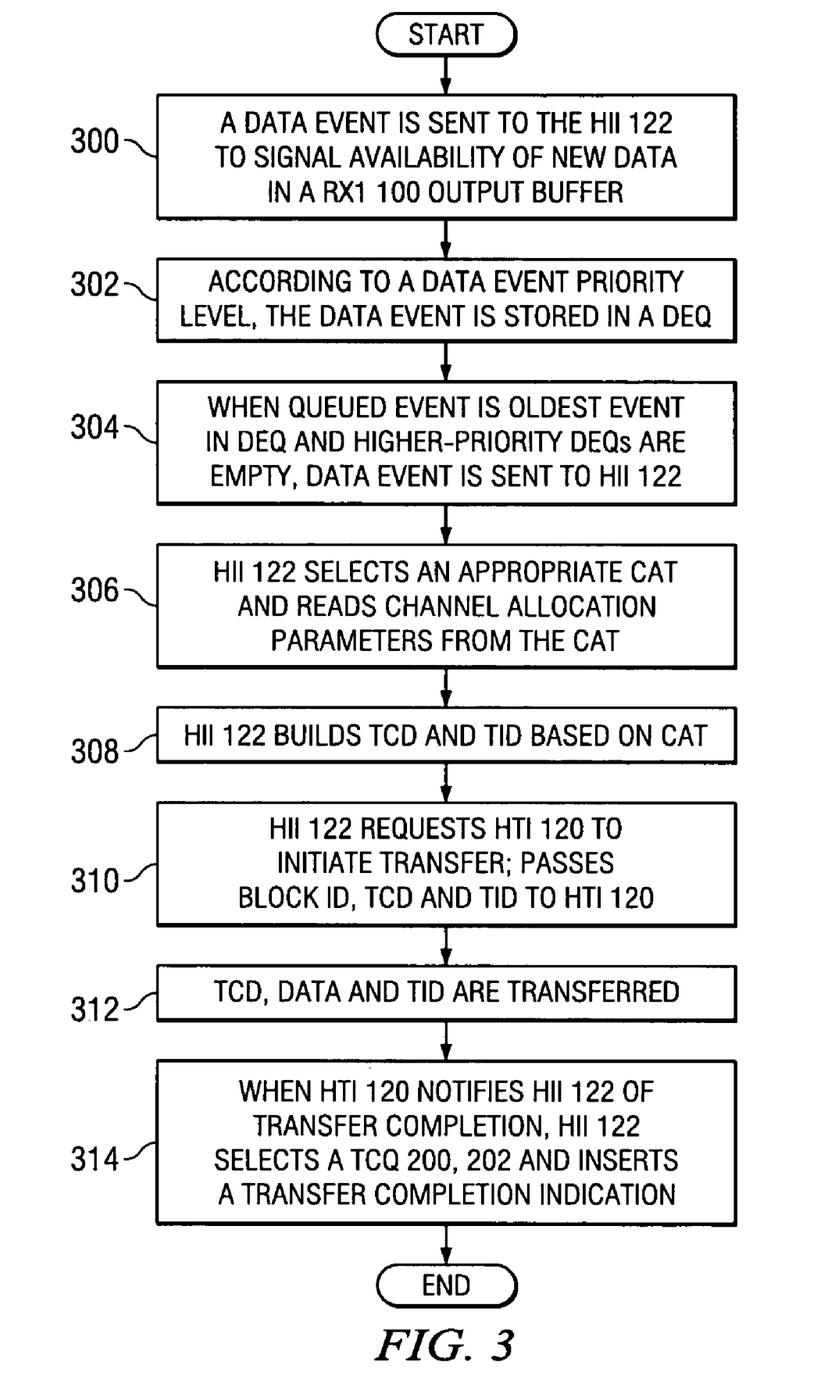
FIG. 3 illustrates a flow diagram in accordance with embodiments of the invention.
Figure 4:
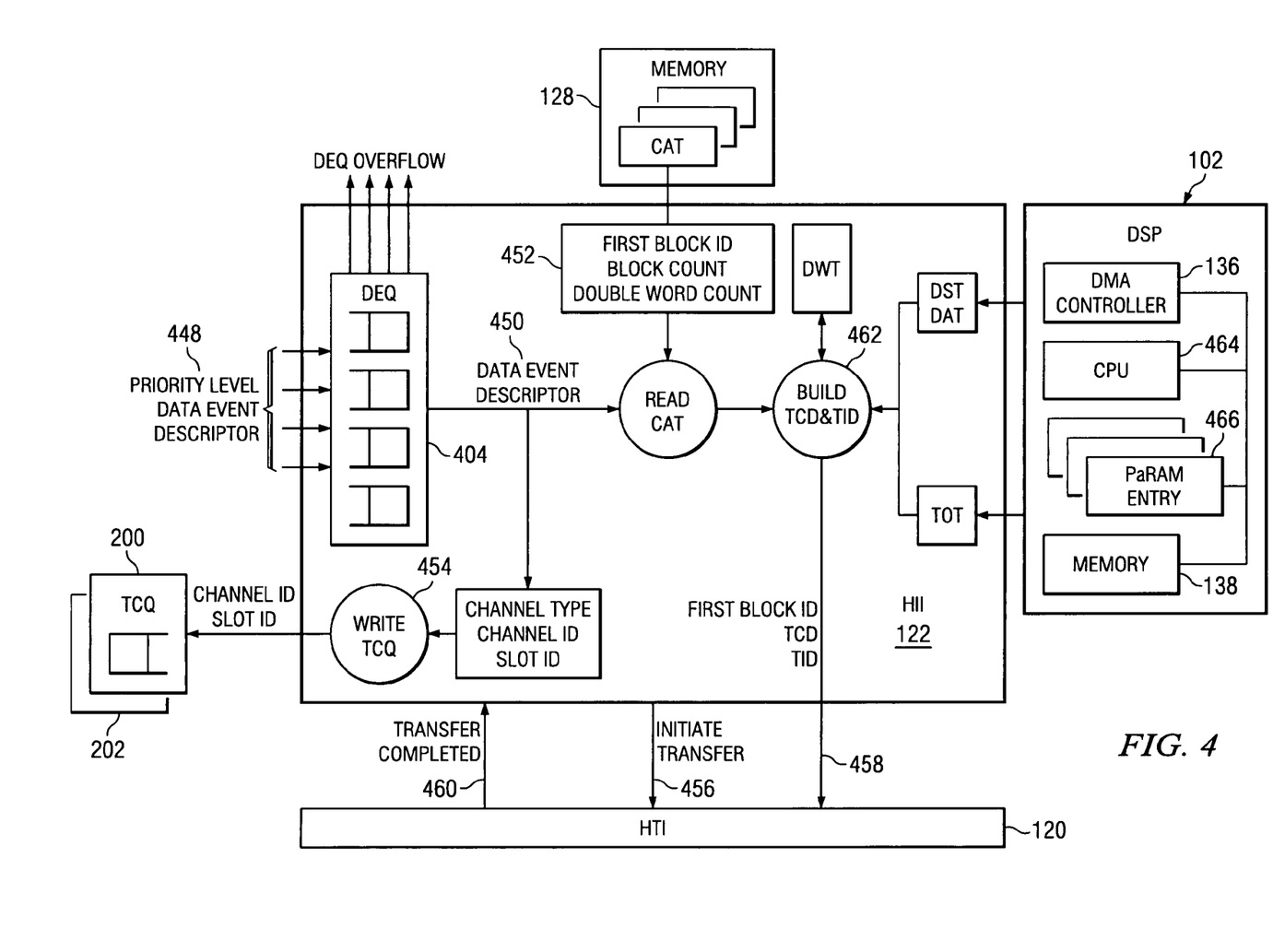
FIG. 4 illustrates a host interrupt interface in communications with a DSP and a HTI in accordance with embodiments of the invention.

FIGS. 3 and 4 illustrate an exemplary data transfer process for the transfer of data between the RX 100 and the DSP 102. The process may begin with the transmission of a data event to the HII 122 to signal availability of new data in an output buffer (block 300). The HII 122 stores the data event in a DEQ 404 based on the priority level of the data event as specified by the data event signal (block 302, action 448). For example, a data event of high priority may be stored in a high-priority DEQ. Likewise, a data event of low priority may be stored in a lower-priority DEQ.

As the DEQ storing the data event is emptied and other, older data events are processed by the HII 122, the data event will increase in seniority in comparison to other data events in the DEQ. When the data event is the oldest event in the DEQ and the DEQs of higher priority are empty, the HII 122 receives the data event from the relevant DEQ (block 304, action 450). Upon receiving the data event, the HII 122 selects an appropriate CAT from the memory 128 and reads channel allocation parameters from the selected CAT (block 306, action 452). Based on this information, the HII 122 builds the TCD and the TID (block 308, action 462). Among other things, the TCD comprises information used by the DMA controller 136 to configure a DMA channel for data transfer, such as a source address, a data element count, and a destination address. The TID is intended for use by a CPU 464 of the DSP 102 as a post-transfer summary of the data transfer (e.g., the amount of data transferred, the location of the data in the memory 138). Because a TCD and a TID is transmitted with each data transfer, the TCD and the TID enable dynamic configuration of the DMA channel through which the data blocks are transferred. In this way, the DMA channel accommodates any data being transferred at any time.

After building the TCD and the TID, the HII 122 transmits the block ID, the TCD and the TID to the HTI 120 (action 458), thereby causing the HTI 120 to initiate a data transfer (block 310, action 456). When the DMA controller 136 triggers a DMA channel, the triggered DMA channel first transfers the TCD from the HTI 120 to a DMA parameter random-access memory ("PaRAM") entry 466. A PaRAM entry 466 comprises various information needed by the DMA controller 136 to obtain data from the RX 100 (e.g., a source memory address, a destination memory address, a data block count). The TCD comprises the information needed to complete the PaRAM entry 466. Thus, the DMA controller 136 uses the TCD to complete the PaRAM entry 466. After completion, the PaRAM entry 466 may be tied to any system event to execute the data transfer instructions contained in the PaRAM entry 466. The system event may be designated by an end-user or any appropriate entity. When the designated system event occurs, the DMA begins retrieving data from the RX 100 as specified by the PaRAM entry 466. In this way, the DMA channel is dynamically reconfigured for each data transfer, substantially increasing data transfer efficiency.

A second DMA channel then transfers the data blocks from the HTI 120 to a destination in the DSP memory 138. The second DMA channel triggers a third DMA channel. In turn, the third DMA channel transfers the TID from the HTI 120 to the memory 138 (block 312). In some embodiments, the third DMA channel also interrupts the CPU 464 to inform the CPU 464 that a transfer is complete. The CPU 464 may refer to the HTI 120 in the memory 138 to obtain details of the recently-completed data transfer (e.g., the amount of data transferred, where the data was stored in the memory 138) so the CPU 464 may retrieve and use the data, if necessary.

When the HTI 120 notifies the HII 122 that the data transfer is complete (action 460), the HII 122 selects a TCQ 200, 202 and records the transfer completion by inserting a transfer completion indication (action 454) into the selected TCQ 200, 202 (block 314). The host interface 134 is now prepared to process a next data event.

Figure 5:
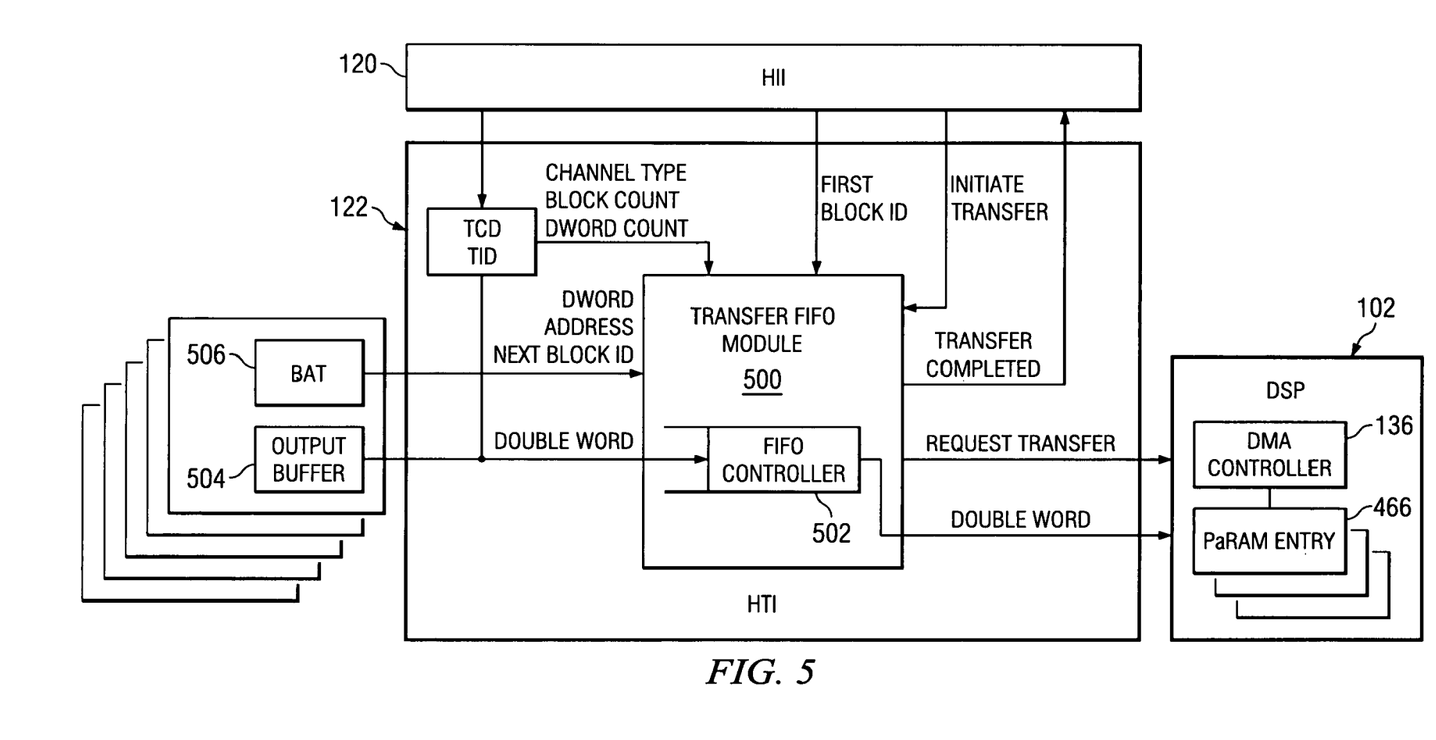
FIG. 5 illustrates a HTI in communications with a HII and a DSP in accordance with embodiments of the invention.
Figure 6:
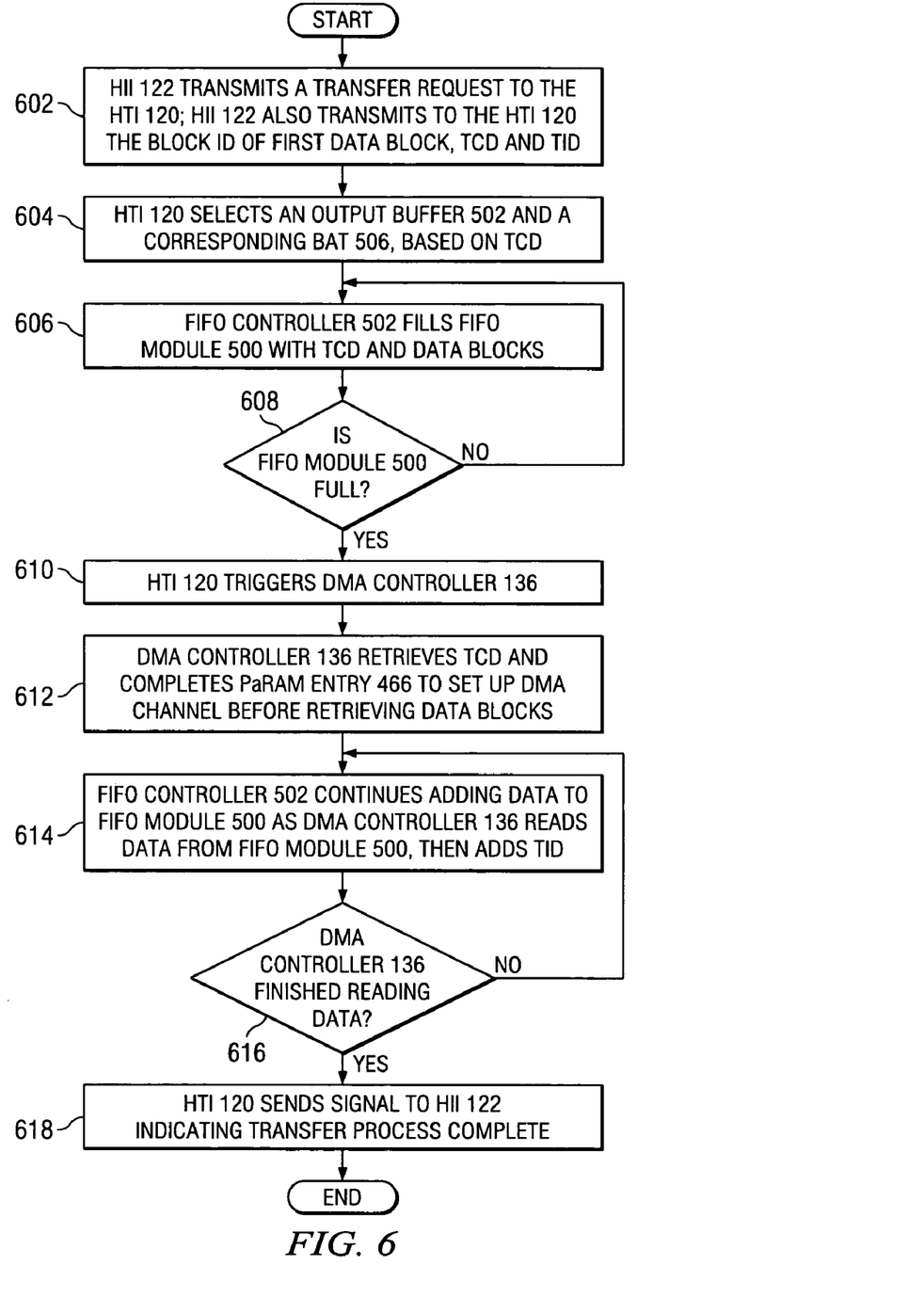
FIG. 6 illustrates a flow diagram in accordance with embodiments of the invention.

FIG. 5 illustrates operation of the HTI 122 in relation to the HII 120 and the DSP 102. Among other things, the HTI 122 comprises a first-in, first-out ("FIFO") module 500. Each data transferred from an output buffer of the RX 100 to the memory 138 passes through the FIFO module 500. The TCD and TID also are transferred through the FIFO module 500. The FIFO module 500 comprises a FIFO controller 502. The FIFO controller 502 manages all external (i.e., DSP read) and internal (i.e., write) accesses to the FIFO module 500. FIG. 6 illustrates a flowchart describing the process by which the HTI 122 completes a data transfer. The process may begin with the HII 122 transmitting a transfer request to the HTI 122, as shown in FIG. 4. The HII 122 also supplies the HTI 120 with the block ID of the first data block, the TCD and the TID (block 602). In turn, the HTI 120 selects an output buffer 504 from which to retrieve data blocks, as specified by the TCD. The HTI 120 also selects a corresponding BAT 506 (block 604). The FIFO controller 502 subsequently begins filling the FIFO module 500 with the TCD and data from the selected output buffer (block 606).

Still referring to FIGS. 5 and 6, when the FIFO module 500 no longer has space available for additional data blocks (block 608), the HTI 120 triggers the DMA controller 136 of the DSP 102 (block 610). The DMA controller 136 first retrieves the TCD from the FIFO module 500 so that a PaRAM entry 466 may be completed, as previously discussed. The DMA controller 136 subsequently begins retrieving data from the FIFO module 500 as specified by the PaRAM entry 466 (block 612). Each time the DMA controller 136 reads data from the FIFO module 500, the FIFO controller 502 adds data blocks from a selected output buffer to the FIFO module 500. The FIFO controller 502 also adds to the FIFO module 500 the TID (block 614). When the DMA controller 136 has finished reading data (block 616), the HTI 120 sends a signal to the HII 122 indicating that the transfer process is complete (block 618).

Figure 7:
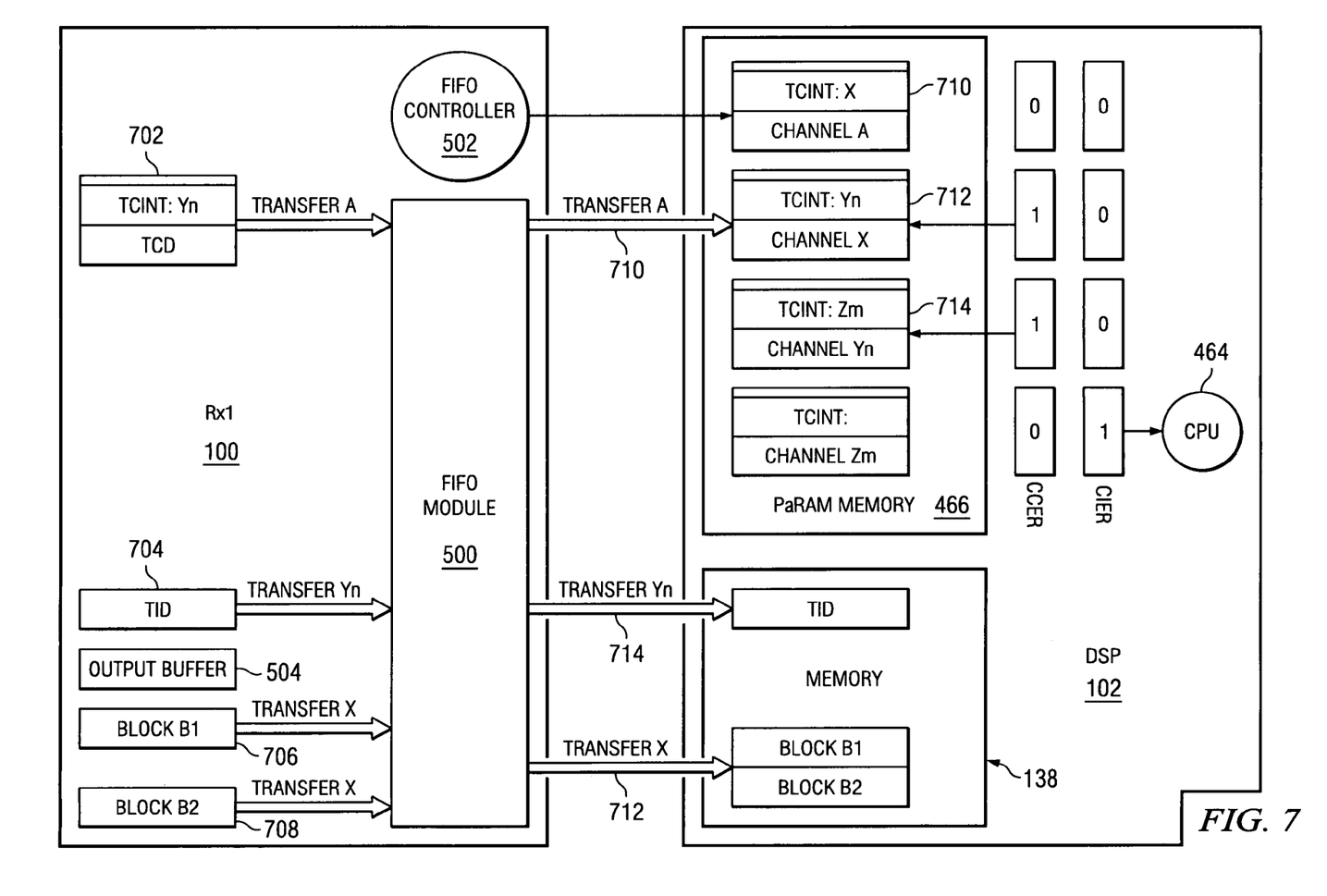
FIG. 7 illustrates a receiver in communications with a DSP in accordance with embodiments of the invention.

FIG. 7 shows an exemplary transfer of a TCD, data blocks, and TID from the RX 100 to the memory 138 in context of DMA channels. The RX 100 comprises, among other things, a FIFO module 500, a FIFO controller 502, an output buffer 504 comprising data block B1 706 and data block B2 708, TCD 702 and TID 704. The DSP 102 comprises, among other things, a CPU 464, a DSP memory 138, a PaRAM 466 with entries for a channel A 710, a channel X 712 and a channel Yn 714. As described above in FIG. 6, when the FIFO module 500 is no longer able to store additional data, the FIFO controller 502 triggers DMA channel A 710. In turn, the channel A 710 transfers the TCD 702 to the DSP 102 so that a PaRAM 466 entry may be completed, as previously discussed.

When a system event tied to the PaRAM 466 entry occurs, the DMA controller 136 begins retrieving data from the RX 100 as specified by the PaRAM 466 entry. More specifically, the single channel X 712 is set up according to PaRAM 466 entry specifications and then is triggered. The single channel X 712 transfers the data blocks B1 706 and B2 708 from the output buffer 504 to the DSP memory 138. Upon completion of this transfer, the channel X 712 triggers the channel Yn 714. In turn, the channel Yn 714 transfers the TID 704 to the memory 138 for future reference by the CPU 464. In some embodiments, after this transfer is complete, the channel Yn 714 may interrupt the CPU 464 to signal completion of the data transfer.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. Data circuitry comprising:
   A. host circuitry including a digital signal processor central processing unit connected with processor memory circuitry, and direct memory access circuitry;
   B. front end interface circuitry; and
   C. receive circuitry including plural modules receiving data signals from the front end circuitry and outputting processed data signals for the memory circuitry, the receive circuitry further including:
      i. transfer memory circuitry containing channel allocation data;
      ii. host interrupt interface circuitry having data event inputs receiving the processed data signals, channel allocation inputs connected with the transfer memory circuitry, an initiate transfer output, and control outputs carrying first block ID signals, transfer configuration information signals, and post-transfer information signals; and
      iii. host transfer interface circuitry having an initiate transfer input connected to the initiate transfer output, control inputs connected to the control outputs, data inputs coupled with the processed data signals, a request transfer output coupled with the direct memory access circuitry, and data outputs, the transfer module including buffer circuitry connected between the data inputs and data outputs and controller circuitry connected to the buffer circuitry, the initiate transfer input, and the control inputs.

2. The circuitry of claim 1 in which the plural modules include a power estimator, a preamble detector, a path monitor, and a finger despreader coupled with an antenna and each having a data event output connected with a data event input of the host interrupt interface module circuitry and each having data outputs coupled with the host transfer interface module circuitry.

* * * * *